United States Patent Office 3,272,015
Patented Sept. 13, 1966

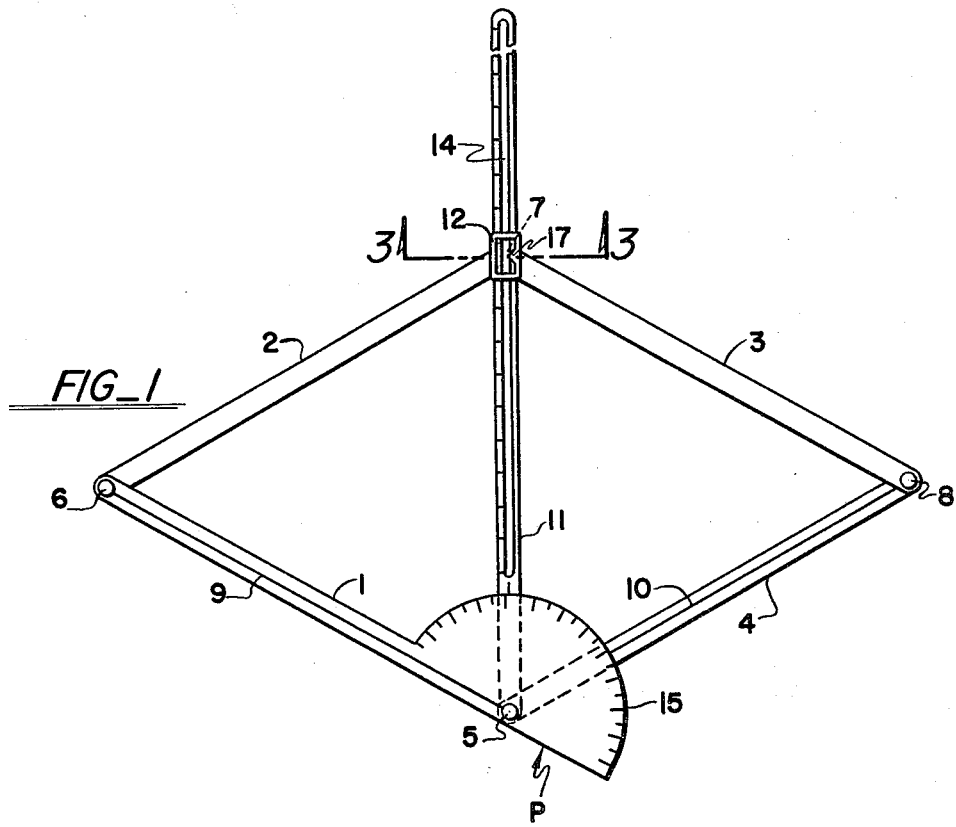
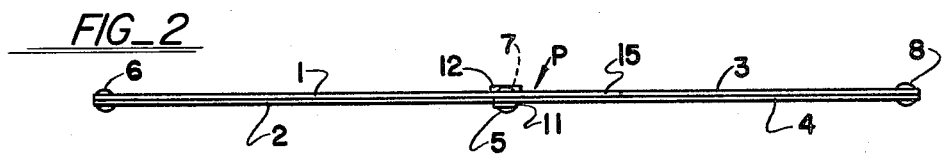
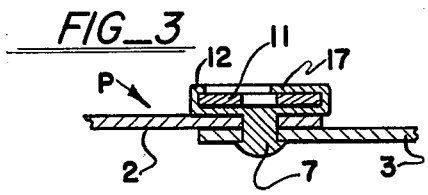
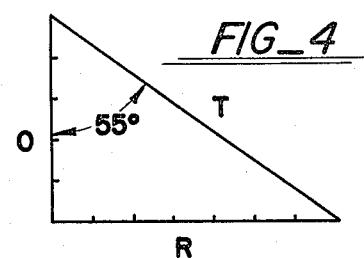

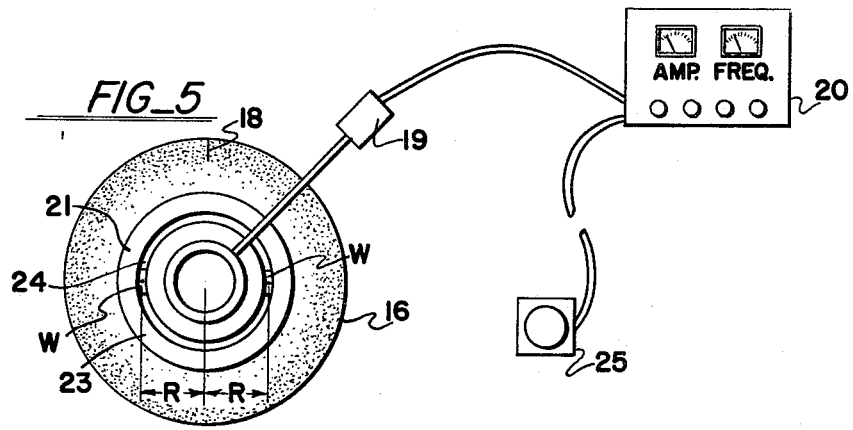
FIG_5
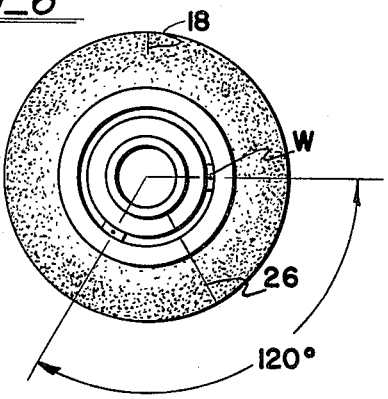
FIG_6
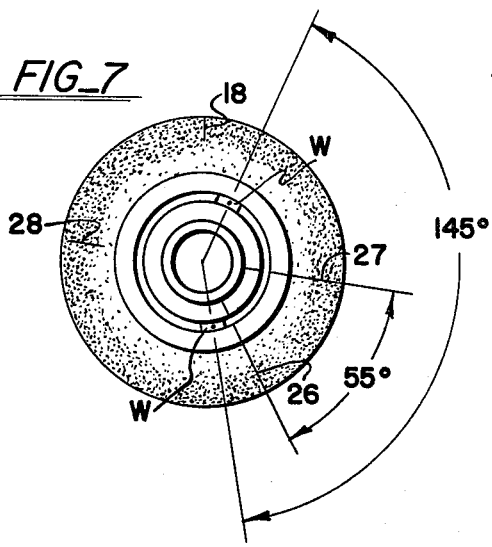
FIG_7

3,272,015
ROTOR BALANCING DEVICE
Carl M. Behm, 27317 Santa Clara Drive, Westlake, Ohio
Filed Nov. 27, 1963, Ser. No. 326,586
7 Claims. (Cl. 73—470)

This invention relates to a balancing device and to a method for dynamically balancing rotating equipment such as rotors, grinding wheels, flywheels, pulleys, and the like. In particular, this invention is directed to the balancing of such equipment by usage of an articulated parallelogram.

Unbalance of rotating parts is a very old and well-known problem to many industries. Unbalance is generally defined as being the unequal distribution of the weight of a part about its rotating center line. There are many causes of unbalance, the most common being blow holes, slag inclusions, and other imperfections in castings, inaccuracy or non-symmetry of unmachined portions of castings and forgings, eccentric hole location, eccentric machining of pulley grooves, all of which add up to more weight on one side of the center line of the part than the other. These imperfections can easily exist in almost every rotating part manufactured.

Another prevalent cause of unbalance is the stack up of tolerances possible when assembling rotating parts. As an example, reference need only be had to the common pulley. The hole in a pulley is necessarily larger than the shaft diameter. Thus when a key or set screw is attached, the take up in clearance shifts the weight of the pulley to one side of the rotating center line of the shaft, and the assembly is out of balance.

All of the combinations of unequal weight distribution are considered to be concentrated at one point on the rotor, which is referred to as the heavy spot. The heavy spot represents the accumulated results of all of the unbalance of the rotor. To compensate for the heavy spot, an equal amount of weight must be placed on the rotating part at the same radius but diametrically opposite the heavy spot in order to balance the part. This can be accomplished in several ways, such as welding or otherwise attaching a weight to the part. Alternatively, the heavy spot can be compensated for by removing weight at the heavy spot, such as by drilling a hole in the part.

It is known in the art to provide balancing rings on the mounts of rotors, grinding wheels, and like rotating parts onto or from which it is not feasible or possible to add or remove weight for balancing. Such balancing rings generally have annular grooves in which plural balancing weights (usually two) are circumferentially adjusted to compensate for heavy spots.

The major problem which has been encountered heretofore in the balancing operation, however, is the fact that the location of the heavy spot is completely unknown. Similarly, the magnitude of the heavy spot is also unknown. The prior art has usually overcome these obstacles by a trial-and-error method of adding a trial weight in an arbitrary manner to the part in order to balance it. Another method of balancing which has previously been employed is that of utilizing vector diagrams. The vector diagram offers a means of graphically plotting the unbalance. The length of a vector represents the magnitude of the unbalance, and the direction of the vector represents the angle thereof with respect to a reference mark. The usage of vector diagrams has proven to be a reliable solution to the problem of balancing of rotating parts. However, this method has proved to be extremely time consuming. In addition, this method does not afford a means for readily and efficiently correcting future unbalance, since it necessarily involves re-computating the unbalance in the same manner.

It is an object of the present invention to provide a device and method for quickly and efficiently balancing rotating parts.

Another object of this invention is the provision of a device and method for balancing rotating parts whereby once an initial correction has been made, future balance corrections can be accomplished with a minimum amount of time.

Other objects, features, and advantages of this invention will become apparent to those skilled in the art in view of the following more detailed description of the invention.

These and other objects are achieved by means of this invention in which the general principle of the vector diagram is utilized in connection with an articulated parallelogram. This parallelogram is comprised of four equilateral side members which are pivotally connected at their extremities. A scale pointer is affixed to the parallelogram at an intersection of two of the side members. The scale pointer is movably connected to the diagonally opposed intersection, and a protractor is connected to the parallelogram at the intersection which has the scale pointer affixed thereon. As will be described in detail, this device, in conjunction with a balancing ring, provides a very simple means and method for correcting unbalance in a rotating part.

The invention will be further understood by referring to the accompanying drawings. It should be understood that the drawings are intended to be only a means of illustrating the inventive concept and are not to be considered a limitation of same.

In said annexed drawings:

FIG. 1 is a plan view of an articulated parallelogram in accordance with the present invention;

FIG. 2 is an elevation view as viewed upwardly from the bottom of FIG. 1;

FIG. 3 is a detail cross-section view on enlarged scale taken substantially along the line 3—3, FIG. 1;

FIG. 4 is a vector diagram in which the vector O denotes the amplitude and phase of unbalance in the original condition of a rotating part with balancing weights thereon disposed 180° apart, in which the vector R denotes the amplitude and phase when the balancing weights are positioned 120° apart, and in which the vector T joining the ends of the vectors O and R indicates the magnitude and phase of balancing weights required to balance an unbalanced rotating part; and FIGS. 5, 6, and 7 illustrate schematically successive steps in the balancing of a rotating part such as a grinding wheel having a balancing ring or wheel mount associated therewith.

Referring to FIGS. 1, 2, and 3, it will be seen that the articulated parallelogram P is comprised of four equilateral side members 1, 2, 3, and 4, which are pivotally connected at their extremities as designated at 5, 6, 7, and 8. Side members 1 and 4 preferably have center lines 9 and 10 and may be graduated if desired. Scale pointer 11 is pivoted on the same pivot 5 as members 1 and 4. The pointer 11 may be scaled along its length in any units such as percent, mils, inches, etc., with percent being the preferred unit because of the greater flexibility in utility. Scale pointer 11 is sildable in the slide portion 12 of pivot 7 at the diagonally opposed corner of the parallelogram P. The scale pointer 11 preferably has a longitudinal slot 14 therein to facilitate marking on the rotating part as will be more fully described. A protractor 15 is connected to the parallelogram P at the pivot 5 of side members 1 and 4 also. In this embodiment, it will be noted that protractor 15 is formed as an integral part and extension of side member 1. It is to be understood that protractor 15 may be independently pivotally mounted at pivot 5.

Side members 1–4 and scale pointer 11 are preferably thin, transparent, and fairly rigid plastic strips, although it is to be understood that metal or similar materials can be used. It is also preferable, for ease of operation, that protractor 15 be of a transparent plastic material.

The method of correcting unbalance of a rotating part by use of this parallelogram can best be understood by considering the following general principles. If two identical weights W (see FIG. 5) are placed on a rotor 180° apart and on the same radius R from the rotational axis of a rotating body 16 as shown in FIG. 5, the centrifugal force which will be created will be in equal amounts and will be diametrically opposed. In terms of balance, there will be no effect. However, as the weights W are adjusted toward each other the centrifugal force will increase proportionately and will approach 2W as the angle therebetween approaches 0°. Thus, when the two weights W are 120°, 90°, and 60° apart the resultants will be 1W, 1.41W, and 1.73W, respectively.

The articulated parallelogram P can be used to determine the effect of the two counterweights W if their location is at any known angle between 0° and 180°. For example, if two weights W 115° apart are placed on a body 16 and the body is rotated, the result can be determined by the parallelogram P simply by positioning the side members 1 and 4 115° apart and reading on the scale of pointer 11 the resultant in terms of percent. In this example the two weights W spaced 115° apart have the same effect as a single weight of 1.15W located midway between the two weights and at the same radius R. Since the scale pointer 11 herein is marked off in percent the slide portion pointer 17 will be at 115% on scale pointer 11 when the side members 1 and 4 are 115° apart. Also the slide pointer 11 will always bisect the angle between side members 1 and 4.

With these principles in mind, the method of my invention can be understood by means of the following illustrative but nonlimiting example.

*Example*

As illustrated in FIG. 5, a reference mark 18 was arbitrarily placed on a body 16, herein a grinding wheel, and a vibration pick-up 19 of an analyzer 20 is attached to the wheel mount 21. The wheel mount 21 herein has a balancing ring portion 23 including a circular groove 24 in which a pair of equal balancing weights W are circumferentially adjustable. The weights W first were placed 180° apart as shown in FIG. 5. The body 16 and wheel mount 21 were then rotated and the unbalance observed on analyzer 20 and recorded on a vector diagram (FIG. 4) as amplitude and phase, indicated as O (original condition). The phase is the position of the reference mark 18 as observed by the stroboscopic light 25. This is shown graphically in FIG. 4 as an unbalance of 5 mils amplitude at twelve o'clock phase. The body 16 was then stopped and the two counterparts W were adjusted to an angle of 120° which is equivalent to one weight W on radius R and at the mid-point 26 as shown in FIG. 6. It should be understood that the counterweights W can be positioned any place in the groove 24 so long as the angle between the two weights W is 120° since the original reference mark 18 was placed at a purely arbitrary position on the part 16 and since the adjustment of the weights W is merely to indicate the change in the unbalance which a single weight W will achieve. The slot 14 of scale pointer 11 of the articulated parallelogram P was used to mark the midposition between the counterweights W. This position 26 was marked on the part 16 (FIG. 6) using the articulated parallelogram P (scale pointer 11 and longitudinal slot 14) and the center of the part 16.

The part 16 was rotated again, and the unbalance observed and recorded on the vector diagram (FIG. 4) as R (result of adding a trial weight W). In this example, the unbalance was 7 mils amplitude at three o'clock phase. The vector diagram was completed by joining the lines of O and R. This new line is called T. The length of line T was next measured to the same scale as used for lines O and R. In this example the length of T was 8.62. The correct amount of balancing weight was then determined by the standard vector equation: $O/T \times \text{percent } W = \text{Balancing weight}$. In this example, $5/8.62 \times 1W = 0.58W$.

The articulated parallelogram P was next used to determine the angle at which the counterweights W must be placed to equal 0.58 W of effective weight. This angle is 145° when pointer portion 17 registers with 58% on the scale pointer 11.

The new location of the counterweight setting was next determined from the vector diagram as follows. The angle and direction of O to T in the vector diagram is the angle and direction in which the balancing weight 0.58W must be moved. In this example, O to T is 55° in a counterclockwise direction. Next, a line 27, FIG. 7, 55° counterclockwise from the line 26 identified above (that marked on the part 16 when the counterweights W were adjusted to 120°) was marked on the part 16. The pointer 11 of the articulated parallelogram P was set at this new location point 27, and the articulated parallelogram P was adjusted to 145° (that angle determined previously which is necessary to equal the weight of 0.58W) to determine the new location (FIG. 7) of the two correction weights W. The rotor 16 was again tested in order to determine the amount of unbalance, if any. No reading was recorded, thereby indicating that the rotating part 16 was now balanced.

The permanent heavy spot can now be located as being a point diametrically opposite that point 27 where the effective correction weight .58W was added (light spot). Since, in this example, the correct effective weight (.58W) was added at a position of approximately four o'clock as indicated in FIG. 7, this means that the permanent heavy spot 28 on the part 16 is at approximately ten o'clock. The permanent heavy spot will then be recorded, such information being very useful for the purpose of any future balancings which may be required.

If at a future time, the same rotating part 16 becomes unbalanced, the balance correction may be readily and easily achieved as follows. The permanent heavy spot 28 on the part 16 is known, and consequently, the position at which the corrective weight .58W for 5 mils unbalance must be added is also known. Since the member 11 of the parallelogram is a scaled pointer, it will automatically give the correct angle at which to place the counterweights W for any future balancing corrections up to nearly 2W as the pivots 6 and 8 approach each other. To make the future balance corrections, the scale pointer 11 is pointed towards the permanent light spot location 27, i.e., that diametrically opposite the permanent heavy spot 28, and the counterweights W are placed at the angle directed on the scale as required for the necessary number of mils amplitude.

It is thus seen that a device and method have been disclosed for balancing of rotating parts in a relatively simple manner in a minimum amount of time. It will be appreciated that this is especially true after the initial balancing has been performed. As demonstrated, future balancings can be performed by use of the articulated parallelogram P in a fraction of the time required by the methods of the prior art.

The device and method of this invention are intended to be applicable to the balancing of rotating parts in which any of the known vibration pick-up devices can be employed. Illustrative examples are those employing a strobe light 25, the accelerometer-type devices, and those operating on the strain gauge principle. Similarly, this invention is intended to be usable in the balancing of numerous rotating devices, such as rotors of all types, gear wheels, grinding wheels, pulleys, etc. The system herein described is also applicable to two plane balancing, the principles for such being unchanged from those disclosed.

It is to be understood that many equivalent modifications will be apparent to those skilled in the art from a reading of the foregoing disclosure without a departure from the intended concept of the invention. Only such limitations as indicated in the appendant claims should be applied to this invention.

Other modes of applying the principle of the invention may be employed, change being made as regards the details described, provided the features stated in any of the following claims, or the equivalent of such, be employed.

I therefore particularly point out and distinctly claim as my invention:

1. In a method of dynamically balancing a piece of rotating equipment in which a reference mark is arbitrarily placed on said equipment, a vibration pick-up analyzer is attached to the bearing housing of such equipment, a pair of equal counterweights W are placed 180° apart on said equipment, and the amplitude and phase of unbalance while in rotation are recorded on a vector diagram as O, the improvement wherein an articulated parallelogram having a scale pointer extending diagonally thereof with one end pivotally connected at one vertex of the parallelogram and the other end longitudinally slidable at the diagonally opposed vertex is used to determine various angles between such counterweights and to locate the midpoint therebetween, such method comprising:

(a) adjusting such counterweights to a position 120° apart, using the scale pointer of the articulated parallelogram to locate the midpoint between the counterweights, and marking said midpoint on said equipment, (b) rotating said equipment and observing and recording the amplitude and phase of the new unbalance as R, (c) completing the vector diagram, T, between O and R, and determining the amount of the balancing weight by the equation, $O/T \times$ percent $W =$ Balancing weight, (d) using the articulated parallelogram to determine the angle at which the counterweights must be placed to equal the weight found in step (c) above, and (e) determining the new location of the counterweight setting by measuring the angle and direction of O to T in the vector diagram, finding the point on the equipment in this direction and angle from the point found in step (a) above, and setting the pointer of the articulated parallelogram at the new location point and adjusting the articulated parallelogram to the angle found in step (d) above to determine the new location of the correction weights.

2. The method of balancing a rotating part which has a balancing ring with a circular groove concentric with the axis of rotation of the part in which at least two equal weights W are circumferentially adjustable to provide a resultant balancing weight ranging from O to 2W as said weights W are adjusted from 180° apart to 0° apart, and in which the direction and magnitude of a balancing weight in terms of percent W is known, which comprises the steps of manipulating an articulated parallelogram having side members of equal length pivotally connected together and a slide pointer having a scale graduated in percent W pivotally connected at a first vertex and having longitudinal sliding engagement with the pivot at the diagonally opposite vertex to adjust the length of such slide pointer between said vertices to correspond to the desired percent W of balancing weight required to balance the part and noting the included angle between the side members at said first vertex; and adjusting the weights W to that included angle with the direction of the unbalance bisecting such included angle.

3. The method of claim 2 wherein said first vertex of the articulated parallelogram is placed on the axis of rotation of said part with the scale pointer coinciding with the direction of the unbalance of the part, and the articulated parallelogram is adjusted to the desired percent W as read on the slide pointer; and adjusting the weights W into alignment with the side members defining said first vertex.

4. An articulated parallelogram for use in the balancing of rotating parts and the like which comprises four equilateral side members pivotally connected to one another so as to form a parallelogram, a scale pointer pivotally affixed to said parallelogram at an intersection of two of said side members, a slide portion affixed to the other two of said side members at the diagonally opposed intersection of said parallelogram, said scale pointer extending through said slide portion and slidable longitudinally therein responsive to articulation of said parallelogram, and a protractor connected to one of said two side members and having its center coinciding with the pivot axis at said first mentioned intersection, each of said two side members forming said first mentioned intersection having straight lines passing through said pivot axis, one of said straight lines being aligned with the zero indicia of said protractor and the other of said straight lines cooperating with the circumferential angle indicia of said protractor to denote the included angle of said two side members when said parallelogram is articulated to various positions.

5. The articulated parallelogram of claim 4 in which the scale of said scale pointer is in percent.

6. The articulated parallelogram of claim 5 in which the scale is such that 100 percent is equivalent to an angle of 120° on the articulated parallelogram as measured by the protractor thereon.

7. The articulated parallelogram of claim 4 in which said scale pointer has a longitudinal slot therein and extending therethrough to facilitate marking on a rotational part or the like.

References Cited by the Examiner

UNITED STATES PATENTS

| | | | |
|---|---|---|---|
| 956,356 | 4/1910 | Humbert | 33—91 |
| 1,733,821 | 10/1929 | Pontis | 73—487 X |
| 2,259,619 | 10/1941 | Cooper | 33—91 |
| 2,752,788 | 7/1956 | Penta | 73—480 X |
| 2,866,270 | 12/1958 | Johnson et al. | 33—91 |
| 2,958,165 | 11/1960 | Hofmann | 74—573 X |

OTHER REFERENCES

An article entitled "Turbine Vibration and Balancing," by Rathbone, from the "Transactions of the American Society of Mechanical Engineers," volume 51, No. 1, pages 267–283, page 268.

RICHARD C. QUEISSER, *Primary Examiner.*

JAMES J. GILL, *Examiner.*